(12) United States Patent
Pons et al.

(10) Patent No.: US 8,824,849 B2
(45) Date of Patent: Sep. 2, 2014

(54) FIBER OPTIC CONNECTOR PROCESSING APPARATUS

(75) Inventors: Sean M. Pons, Valdese, NC (US); John M. Ferrell, Hickory, NC (US); Eric M. Price, Hickory, NC (US); Matthew T. Burkett, Hickory, NC (US)

(73) Assignee: Lastar, Inc., Moraine, OH (US)

( * ) Notice: Subject to any disclaimer, the term of this patent is extended or adjusted under 35 U.S.C. 154(b) by 1143 days.

(21) Appl. No.: 12/761,764

(22) Filed: Apr. 16, 2010

(65) Prior Publication Data
US 2011/0252634 A1 Oct. 20, 2011

(51) Int. Cl.
*G02B 6/00* (2006.01)

(52) U.S. Cl.
USPC ............ 385/134; 385/135; 385/137; 385/139

(58) Field of Classification Search
None
See application file for complete search history.

(56) References Cited

U.S. PATENT DOCUMENTS

| | | | |
|---|---|---|---|
| 5,258,613 A * | 11/1993 | Okada et al. ............. | 250/227.11 |
| 5,339,374 A | 8/1994 | Murphy et al. | |
| 5,647,045 A * | 7/1997 | Robinson et al. ............ | 385/135 |
| 6,471,419 B1 | 10/2002 | Hall et al. | |
| 6,616,346 B1 | 9/2003 | Brown et al. | |
| 6,633,719 B2 | 10/2003 | Basavanhally et al. | |
| 6,718,111 B1 | 4/2004 | Suek et al. | |
| 6,733,184 B2 * | 5/2004 | Nguyen et al. .................. | 385/53 |
| 6,827,508 B2 | 12/2004 | Stowe | |
| 7,352,938 B2 | 4/2008 | Bianchi | |
| 2002/0131729 A1 | 9/2002 | Higgins, III | |
| 2003/0002847 A1 | 1/2003 | Shekel et al. | |
| 2003/0081910 A1 | 5/2003 | Gimbel et al. | |
| 2005/0276559 A1 | 12/2005 | Bianchi | |
| 2006/0188208 A1 * | 8/2006 | Carberry ....................... | 385/134 |

* cited by examiner

*Primary Examiner* — Hemang Sanghavi
(74) *Attorney, Agent, or Firm* — Dinsmore & Shohl LLP

(57) ABSTRACT

An automated fiber optic connector processing system for processing a plurality of fiber optic cables and connectors, with each of said cables including an optical fiber, includes a pallet fixture for holding a plurality of fiber optic cables and connectors during movement along a manufacturing line so that the connectors may be secured to the cable ends, and the ends of the cables finished. The pallet fixture includes a pallet base plate, with a stationary fixture mounted along one edge of the pallet base plate. The stationary fixture defines a plurality of channels for receiving fiber optic cable connectors of the plurality of fiber optic cables, and at least one latching plate for retaining the connectors in the plurality of channels. An oven having an elongated oven opening is provided at a first processing station. A robotic processor for cutting the optical fibers of the fiber optic cables, buffing the ends of the optical fibers, and polishing the ends of the optical fibers, is provided at a second station. A conveyor moves the pallet fixture to the first processing station for heat treating the connectors, curing the epoxy that retains the connectors on the ends of the cables, and moves the pallet fixture to the second processing station for cutting and polishing the optical fibers.

19 Claims, 17 Drawing Sheets

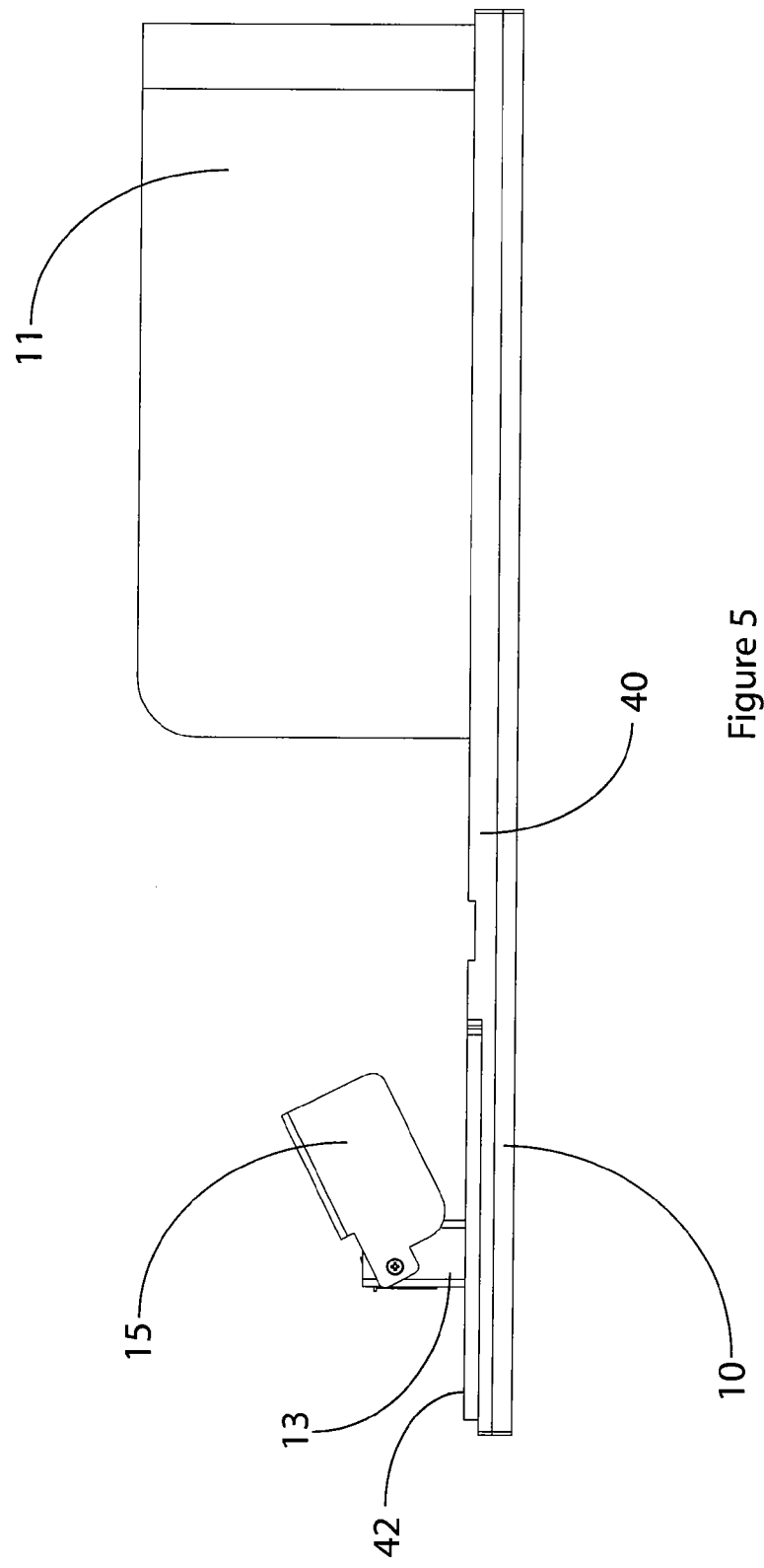

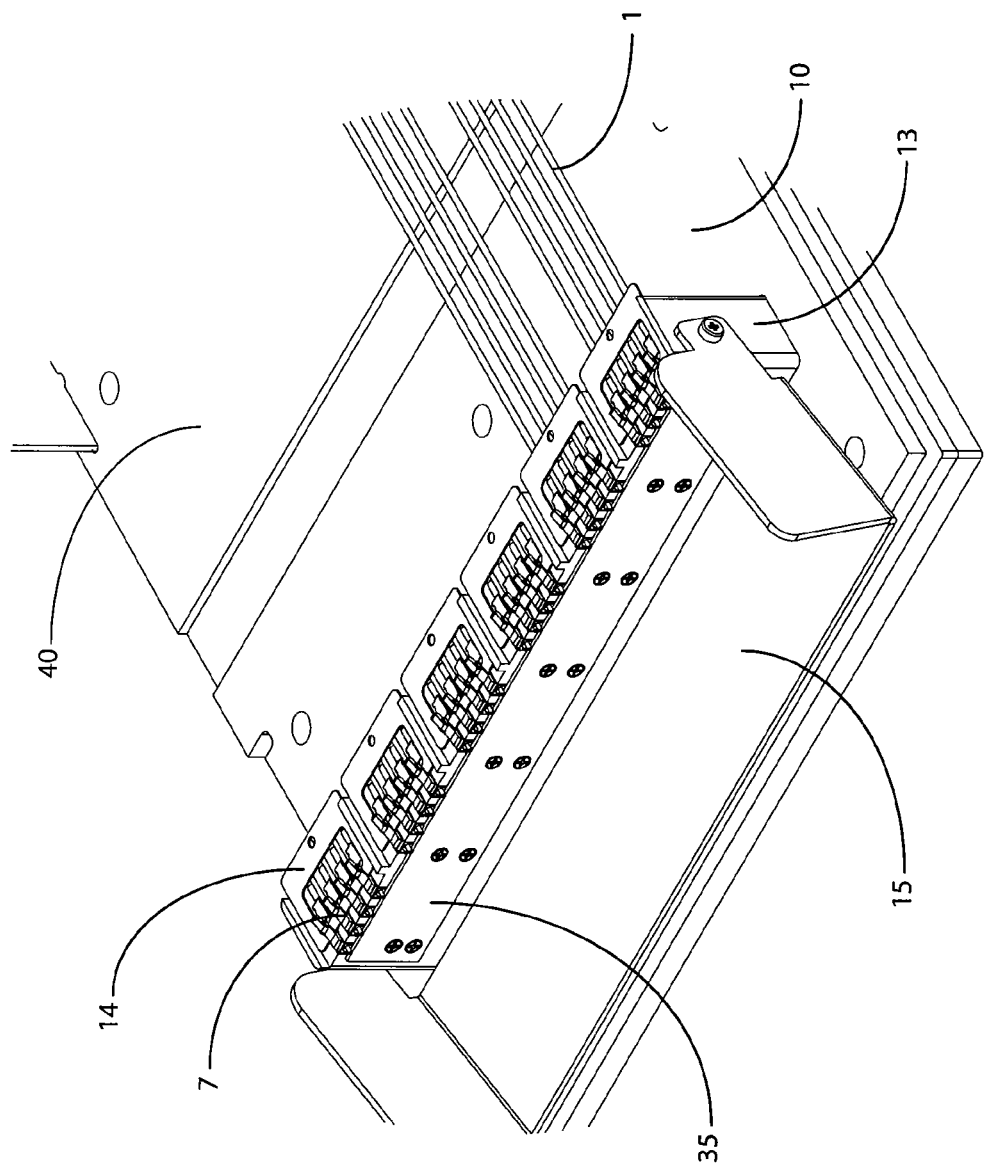

FIBER OPTIC CONNECTOR PROCESSING APPARATUS

CROSS-REFERENCE TO RELATED APPLICATION

Not applicable.

STATEMENT REGARDING FEDERALLY SPONSORED RESEARCH OR DEVELOPMENT

Not applicable.

BACKGROUND

Epoxy-polish fiber optic connectors have been used in fiber communications systems for a number of years. These connectors are used to terminate the ends of optical cables so that the cables can be appropriately connected to various types of fiber optic equipment, and other such fiber optic cables. There are a variety of connector styles in use, with each style suited to a specific business or application segment. Although some connectors are installed on the ends of fiber optic cables in the field when the cables are installed in a system, most high-quality connector terminations are installed in a factory environment where specially configured production equipment can be used to create a uniformly consistent, high quality product.

Typically, a connector on a fiber optic cable is made up of several discrete components, including: 1) a plastic, metal, or ceramic ferrule to support the small, 125 µm glass optical fiber accurately in place; 2) a housing to support the ferrule and to introduce a mechanism to connect to another connector or device; 3) a spring to allow movement of the ferrule to connect to another connector; 4) a crimp band that secures a strength member (made of Kevlar, or the like) to the connector to provide strain relief; and 5) a boot to allow for cable flexing near the back of the unit. In a typical manufacturing operation for optical connectors, several production steps are performed in succession, and much of this has been done manually. First, a cable is stripped of its outer layer or layers down to the layer close to and containing the delicate glass optical fiber. These layers are typically as follows: a glass fiber (125 µm diameter with a 250 µm coating), a buffer layer (600-900 µm), a layer of aramid yarn (strength member), and the outer jacket (1.6-3.0 mm). Each layer is cut to a specific length to support a given connector style properly. Hand tools, strippers, and cutters have been used for this operation, along with some automated pneumatic and electrical devices. A small amount of epoxy is then injected into the ferrule through a small hole, and the optical fiber is fed through the epoxy-filled ferrule. The optical fiber fed through the connector ferrule is longer than ultimately needed, so that it extends well beyond the ferrule. This excess length of fiber is subsequently removed. By using more glass fiber than needed, it is ensured that the glass fiber does not terminate below the surface of the connector ferrule.

Next, the connector is exposed to an elevated temperature in an oven to cure the epoxy and to secure the fiber in place permanently. Typically, a single connector is manually placed in an oven by itself, and then removed and allowed to cool. After the epoxy is cured and the connector cooled, the excess glass fiber protruding from the end of the connector ferrule is removed. A hard blade or tip, such as a diamond, ruby, or carbide device, is used to score the fiber close to the ferrule end face, producing a clean fracture line in the glass. The excess fiber is then manually removed and discarded. The end of the glass fiber is then buffed, and the fiber and the ferrule end face are polished. A problem sometimes arises in accurately scoring the glass so that a clean fracture can be achieved, since the position and size of the score line is smaller than can be observed by the naked eye. A poor cleave or break can cause a fracture that leaves part or all of the glass fiber below the end surface of the ferrule. In many cases, the glass left below the flush surface of the ferrule end face cannot be reached during polishing, thus preventing adequate optical performance from being achieved by the connector. To compensate for this, more glass fiber is left protruding from the ferrule. A lightly abrasive film or pad can then be used to polish the glass and epoxy down manually, bringing the end of the glass and encapsulating epoxy bead to the surface or close to the surface of the ferrule end face. This, of course, requires an additional step, adding to cost. An alternative method is to use a laser to burn the glass off at the end of the ferrule. Though this is an effective method, the equipment is expensive, and the process requires additional safety precautions.

After the buffing process, the connectors are then typically loaded into a fixture and polished by machine with various lapping films to produce a well-shaped connector tip with a mirror-like surface having almost no imperfections. Since there are many variations in the types of connectors, cables, and individual processes involved in the manufacture of optical cable assemblies, it has been difficult to effect improvements that are effective in dealing with such a variety of connectors.

SUMMARY

A pallet fixture and an automated fiber optic connector processing system for processing a plurality of fiber optic cables and connectors, facilitates curing epoxy in the connectors, and cutting, buffing, and polishing the optical fibers extending from the connectors on the ends of the cables. The pallet fixture holds a plurality of fiber optic cables and connectors during movement along a manufacturing line so that the connectors may be secured to the cable ends, and the ends of the cables finished. The pallet fixture includes a rectangular pallet base plate, and a stationary fixture mounted along one edge of the pallet base plate. The stationary fixture defines a plurality of channels for receiving the fiber optic cable connectors of the plurality of fiber optic cables. At least one latching plate is provided for retaining the connectors in the plurality of channels, and a plurality of latching plates may be used.

The pallet fixture may include a support post extending upward from the base plate, such that the plurality of fiber optic cables may be wrapped therearound. The pallet fixture may further include a supporting band, mounted on the pallet base plate and extending partially around the periphery thereof, to retain the cables on the pallet fixture. The pallet fixture may also include a heat shield secured to the stationary fixture such that the cables are protected from heat during heat treatment of the connectors. The heat shield may be pivotally attached to the stationary fixture. The heat shield can be pivoted into an open position to permit loading and unloading the pallet fixture with a plurality of fiber optic cables and connectors. The heat shield can be pivoted into a closed position in which the connectors are exposed to heat from a furnace while the cables are shielded from such heat.

The automated fiber optic connector processing system for processing a plurality of fiber optic cables and connectors, each of the cables having an optical fiber, includes the pallet fixture for holding a plurality of fiber optic cables and connectors during movement along a manufacturing line. The connectors may be secured to the cable ends, and the ends of the cables finished by the processing system. The fixture includes a pallet base plate, a stationary fixture mounted along one edge of the pallet base plate, with the stationary fixture defining a plurality of channels for receiving fiber optic cable connectors of the plurality of fiber optic cables, and at least one latching plate for retaining the connectors in the plurality of channels. The system has an oven at a first processing station having an elongated oven opening, and a robotic processor at a second station for cutting the optical fibers of the fiber optic cables, buffing the ends of the optical fibers, and polishing the ends of the optical fibers. The system additionally includes a conveyor for moving the pallet fixture to the first processing station for heat treating the connectors, and for moving the pallet fixture to the second processing station for cutting, buffing and polishing the optical fibers. If desired, only cutting may be performed at the second processing station.

The conveyor transports the pallet fixture to the elongated opening of the oven such that the connectors are exposed to heat from the oven. The oven directs heat to each of the connectors such that the epoxy therein is cured. The robotic processor is capable of processing each connector, and includes a scribing blade, a buffing pad, and polishing wheel.

BRIEF DESCRIPTION OF THE DRAWINGS

FIG. 5 is a side plan view of the pallet fixture of FIG. 4;

FIG. 18 is a partial isometric view of the pallet fixture with the heat shield pivoted into position to permit the fiber optic cables to be placed on the pallet fixture or removed from the pallet fixture.

DETAILED DESCRIPTION

Figure 1:
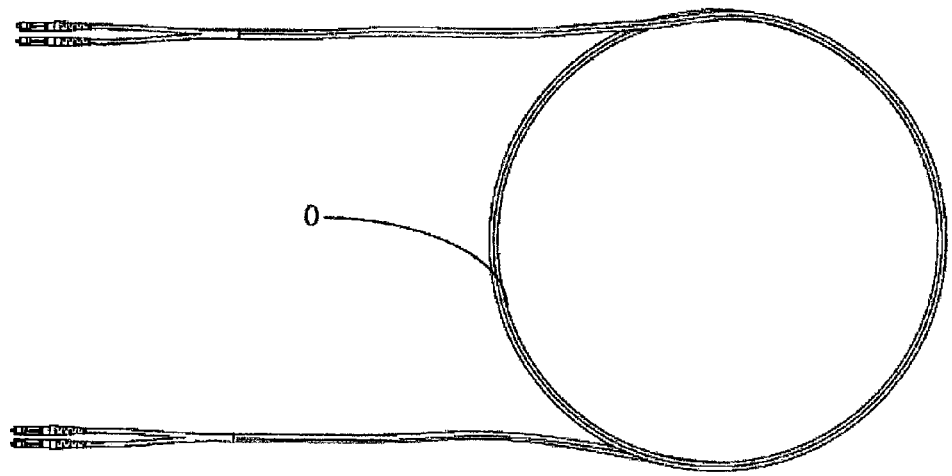
FIG. 1 is an isometric view of a fiber optic cable.
Figure 2:
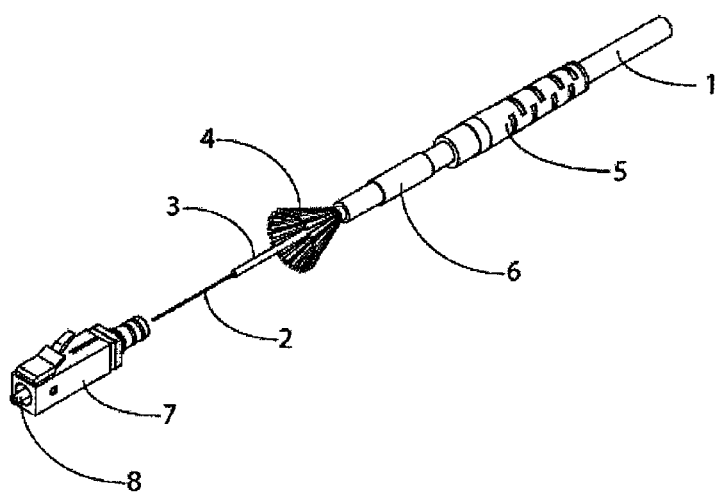
FIG. 2 is an isometric exploded view of an end of a fiber optic cable.
Figure 3:
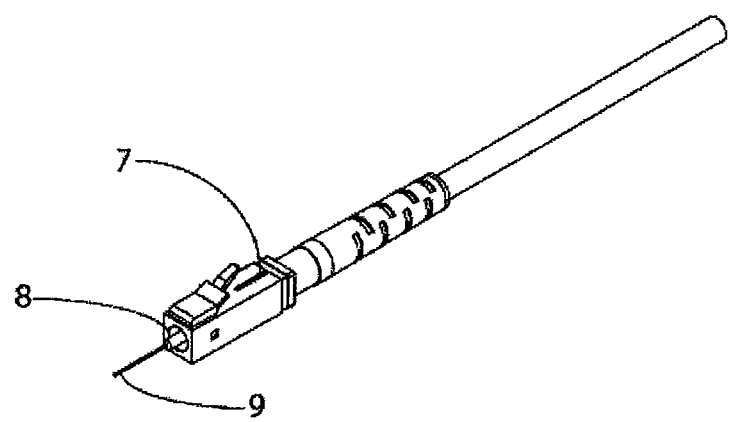
FIG. 3 is an isometric view of an end of a fiber optic cable with a connector installed.
Figure 4:
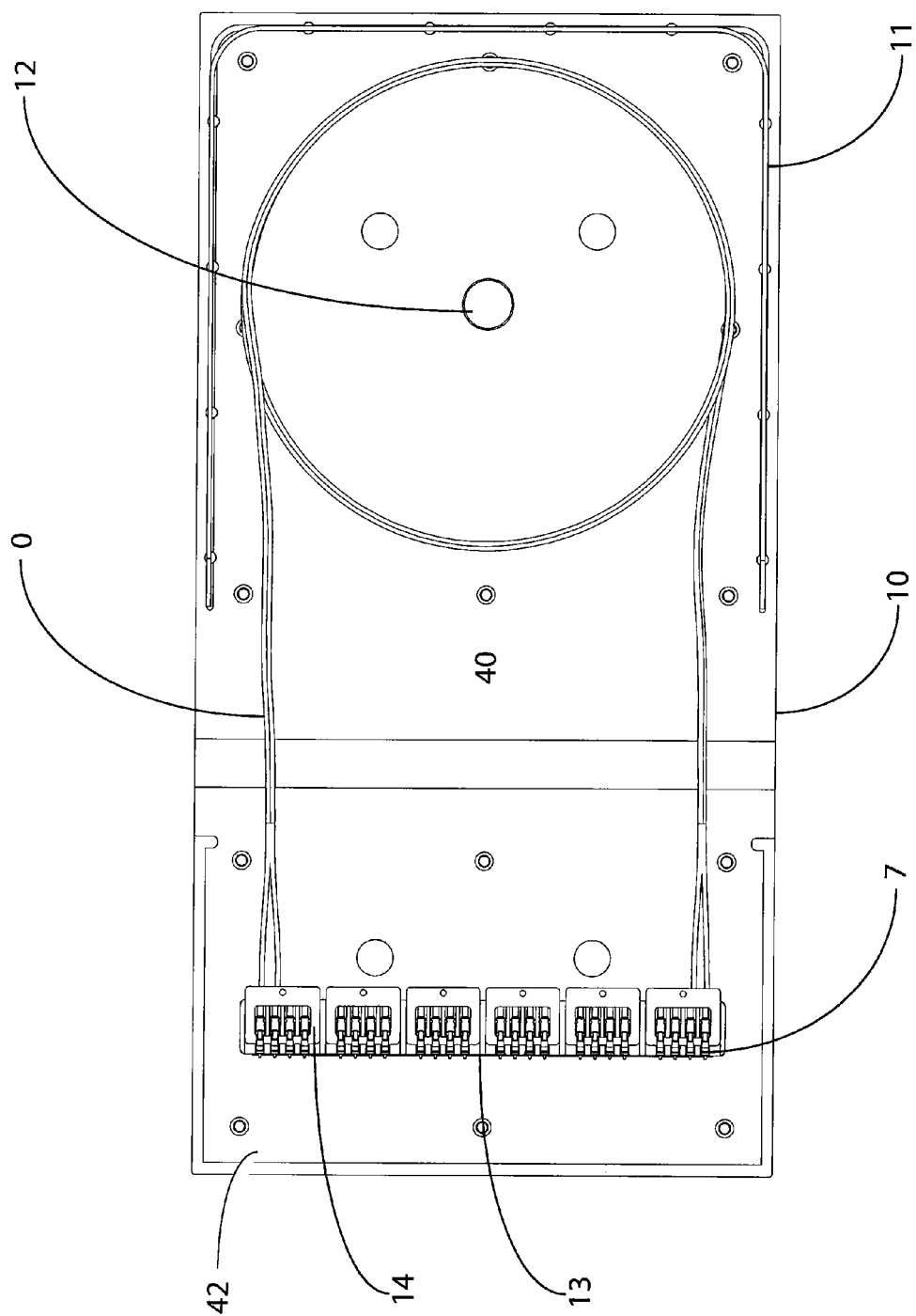
FIG. 4 is a top plan view of a pallet fixture with a fiber optic cable.
Figure 5A:
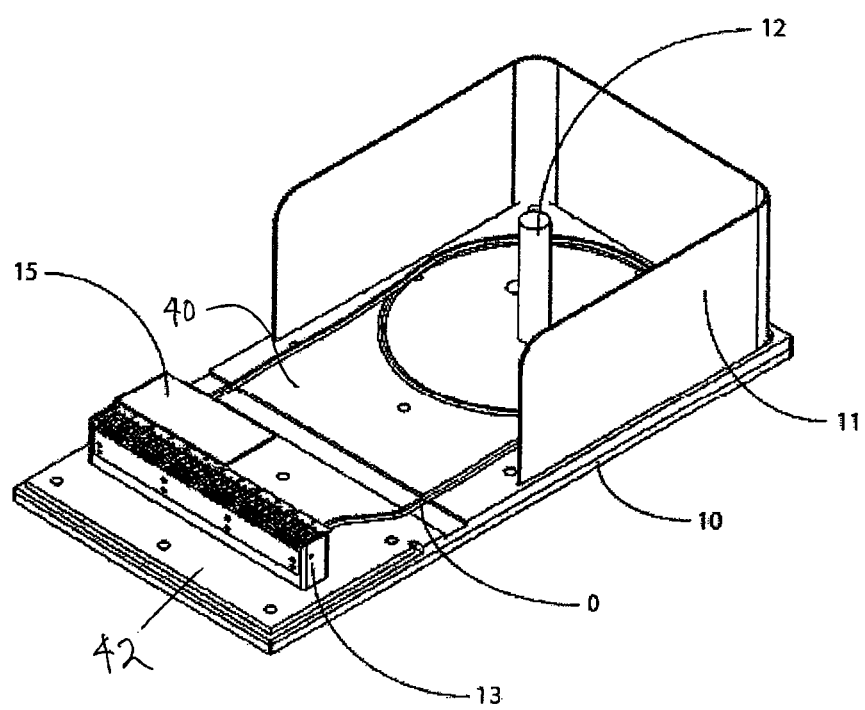
FIG. 5A is an isometric view of the pallet fixture.
Figure 6:
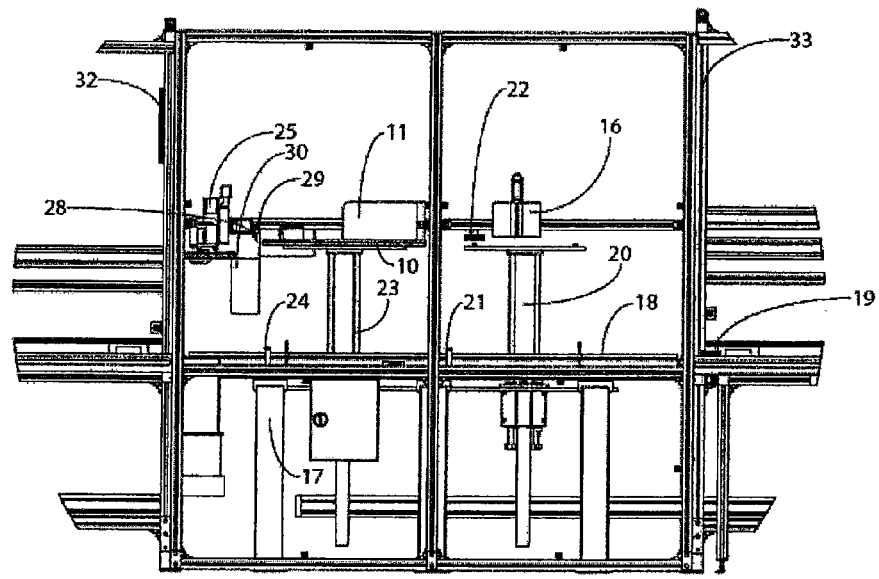
FIG. 6 is a side view of the fiber optic cable processing system, showing the conveyor, lifts, oven, robot, and pallet fixture along with the enclosing framework.
Figure 7:
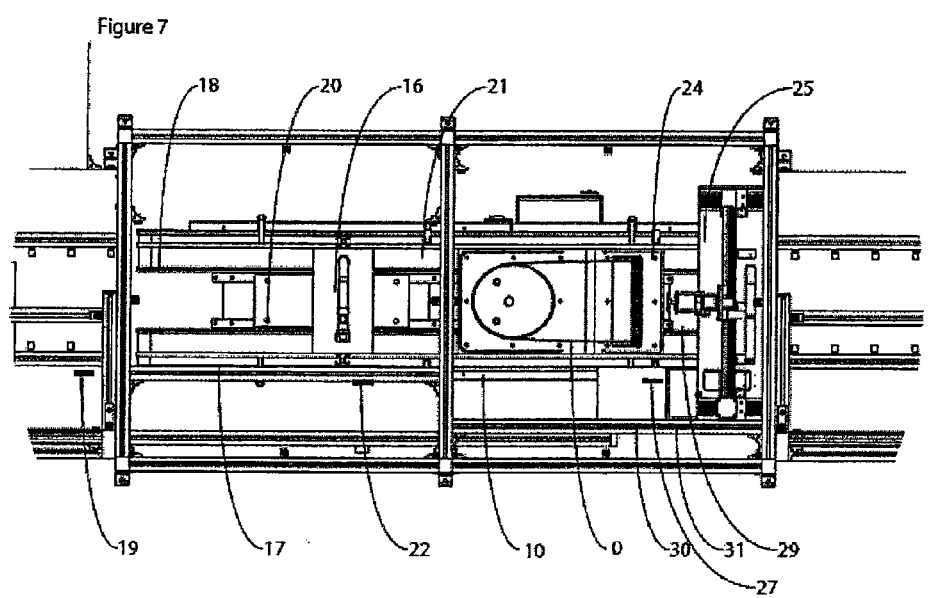
FIG. 7 is a top view of the system of FIG. 6.
Figure 8:
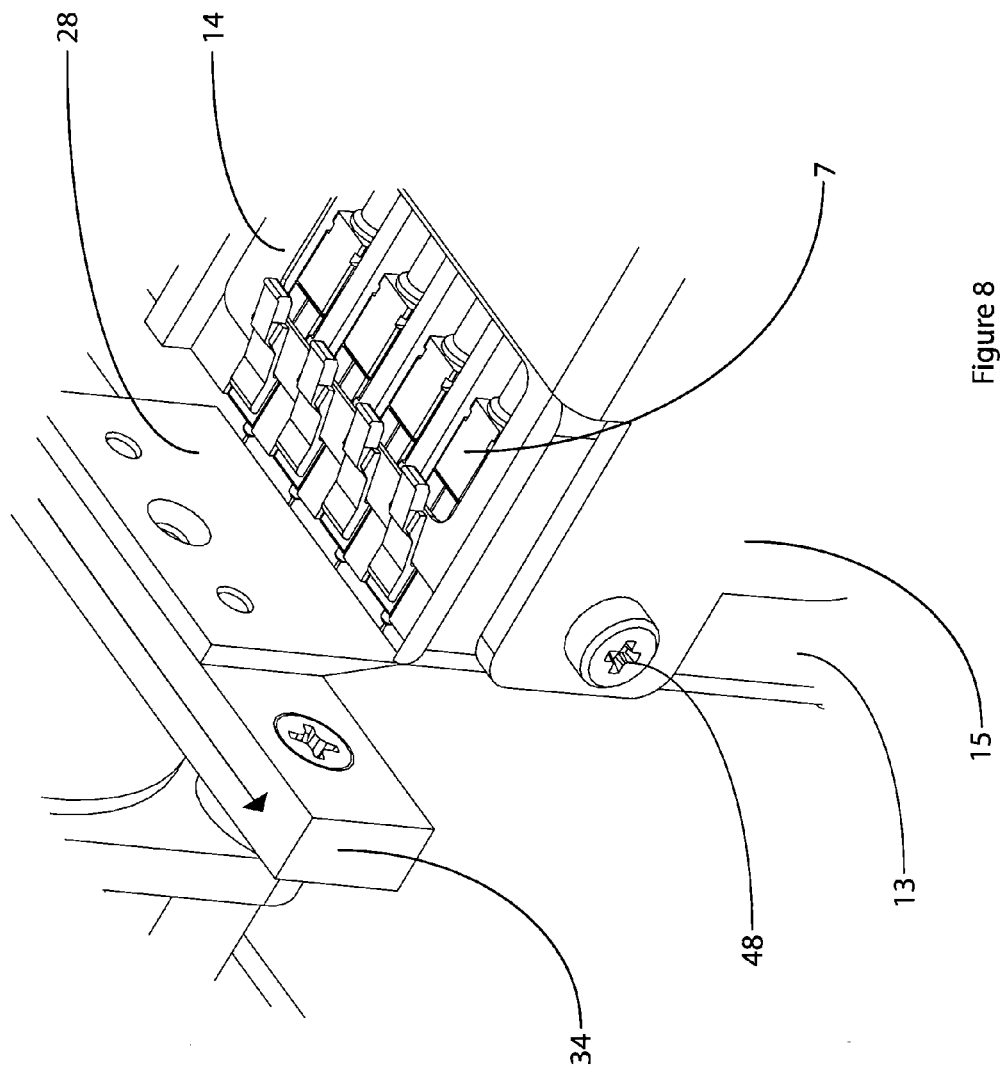
FIG. 8 is a partial isometric view of the pallet fixture, showing the robotic controlled scribing blade.
Figure 9:
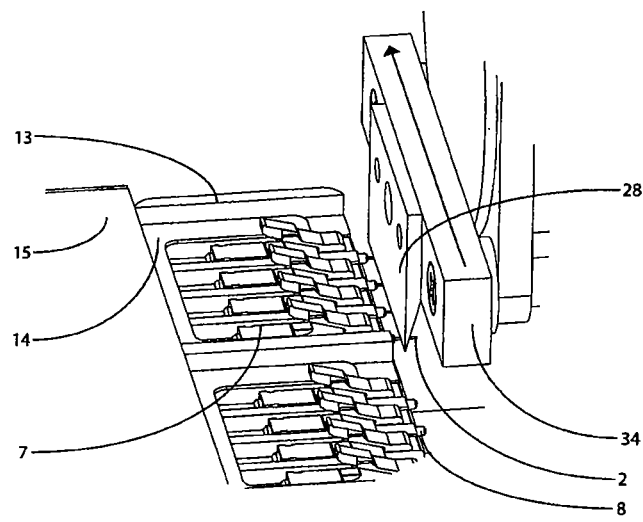
FIG. 9 is a partial isometric view of the pallet fixture, showing the robotic controlled scribing blade of FIG. 8 from the opposite side.
Figure 10:
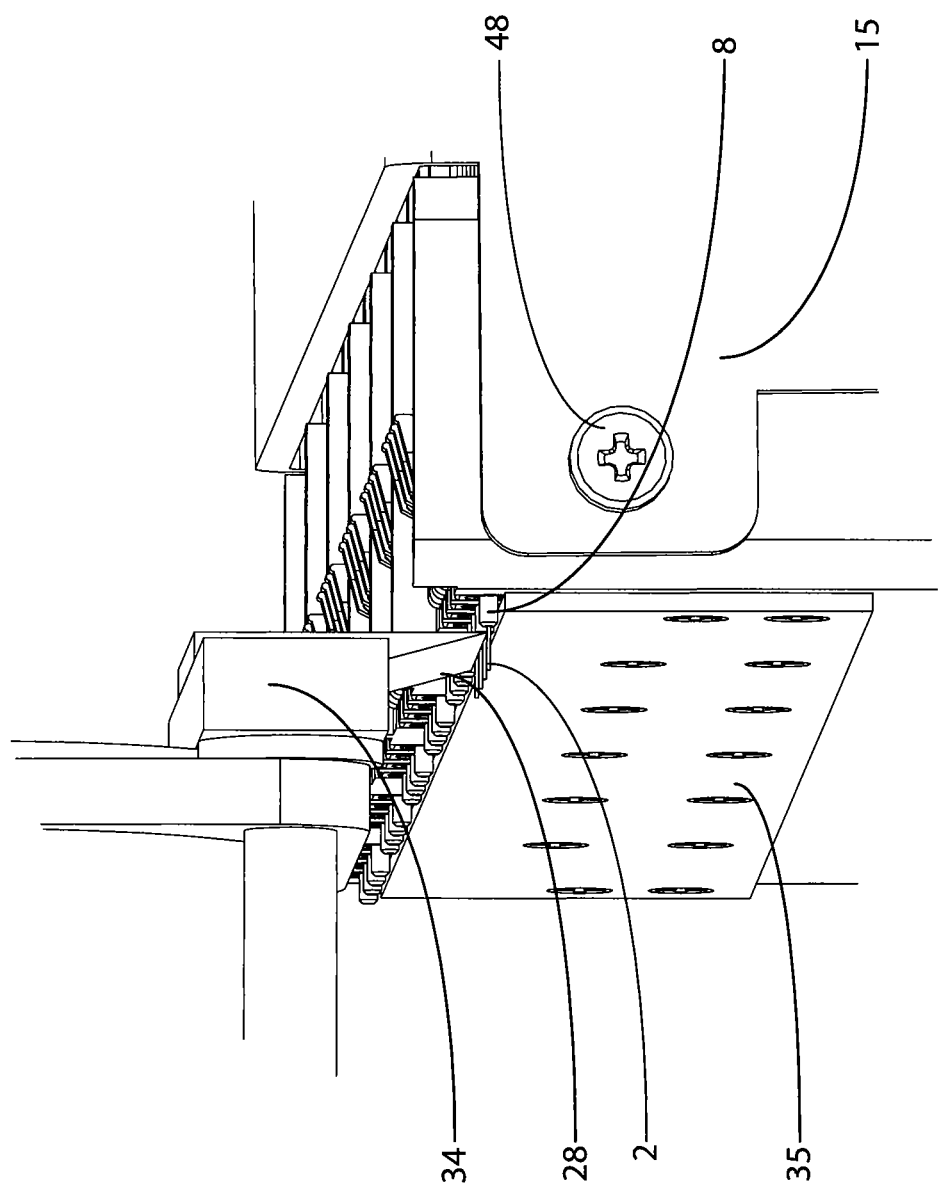
FIG. 10 is another partial isometric view of the pallet fixture, showing the robotic controlled scribing blade of FIG. 8 from the same side, but from a slightly different vantage point.
Figure 11:
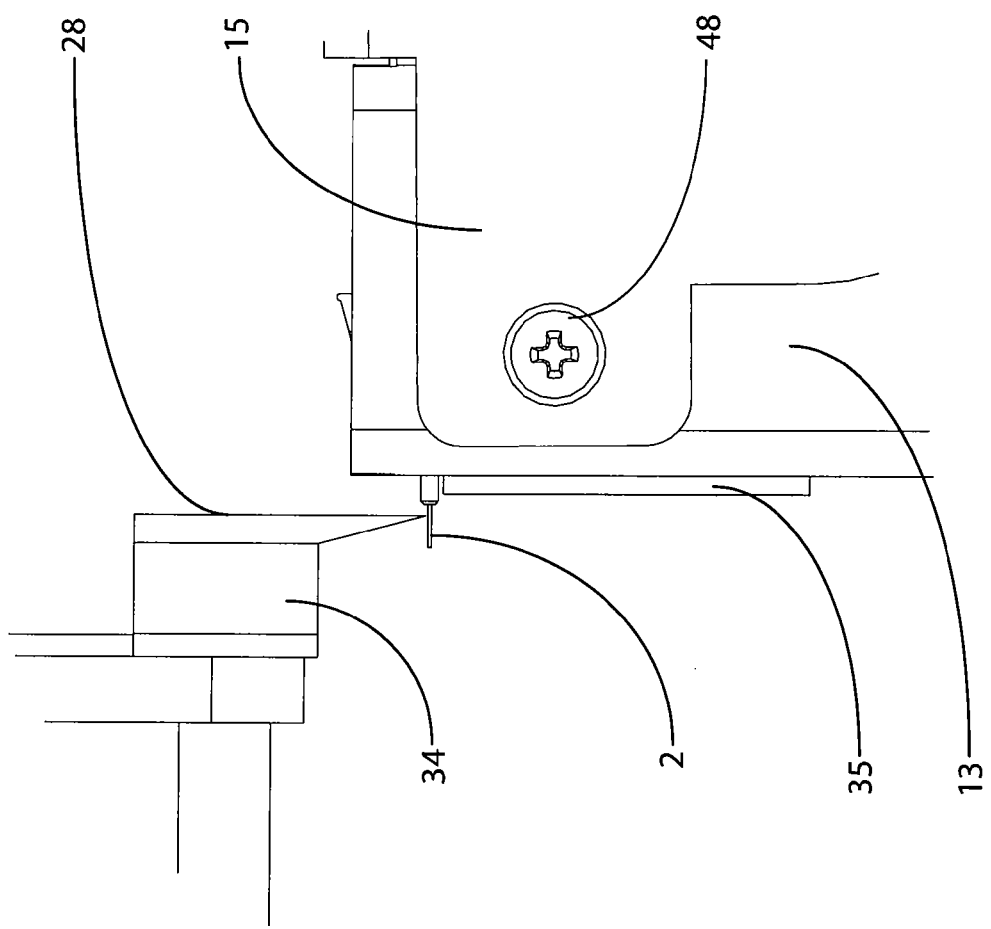
FIG. 11 a plan view, similar to FIG. 8, showing the pallet fixture and the robotic controlled scribing blade.
Figure 12:
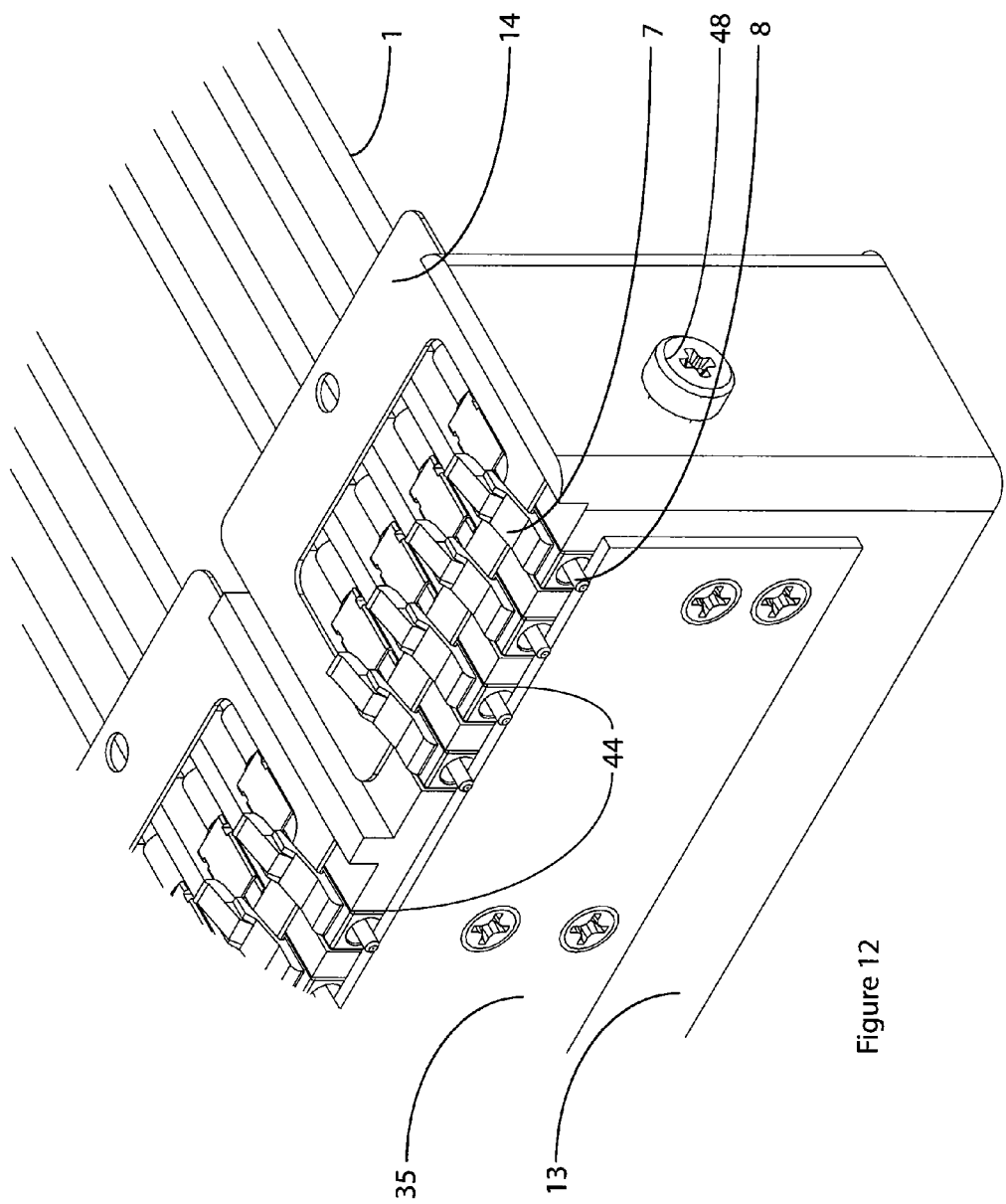
FIG. 12 is an enlarged partial isometric view of a portion of the pallet fixture, showing the cable connectors in the channels defined by the stationary fixture.
Figure 13:
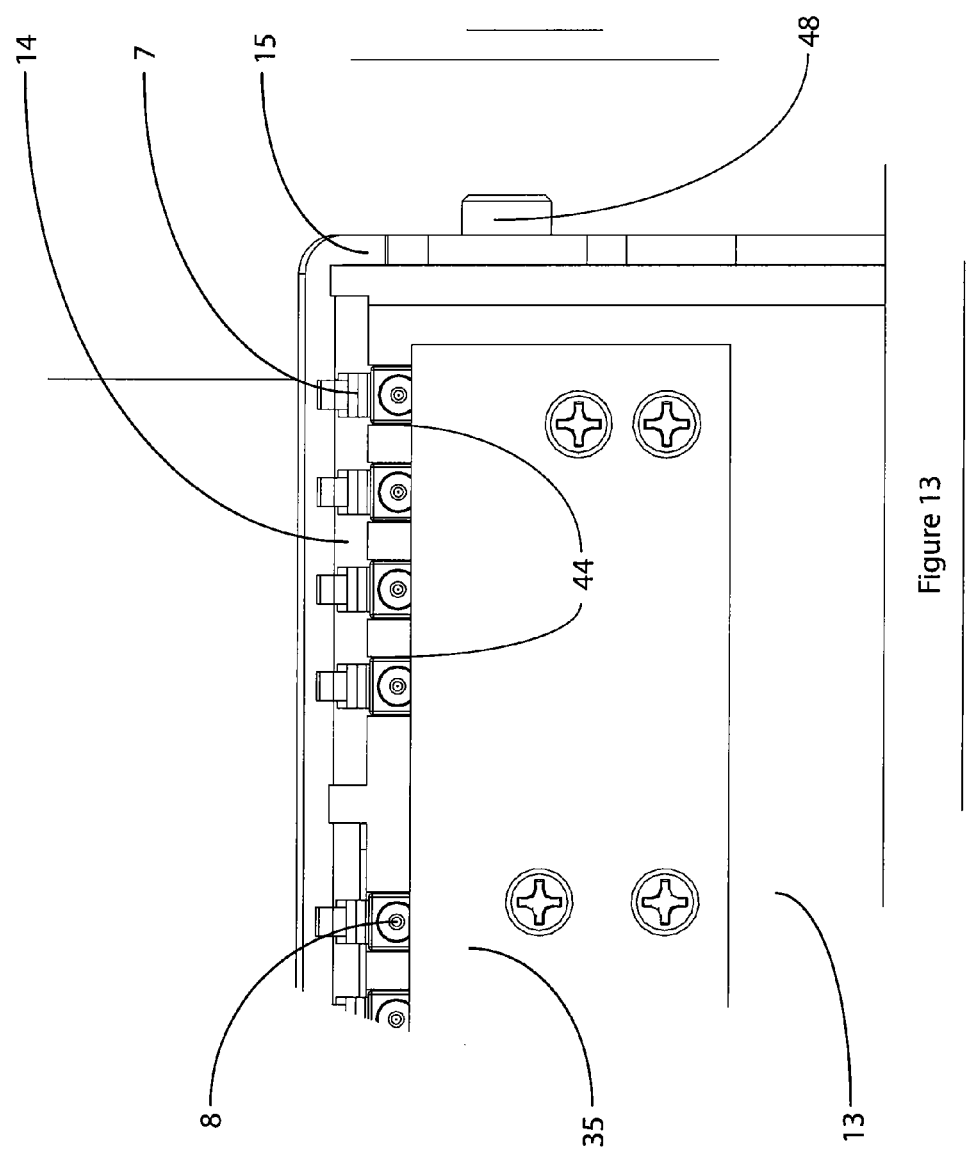
FIG. 13 is a plan view of the a portion of the pallet fixture, showing the cable connectors in the channels defined by the stationary fixture.
Figure 14:
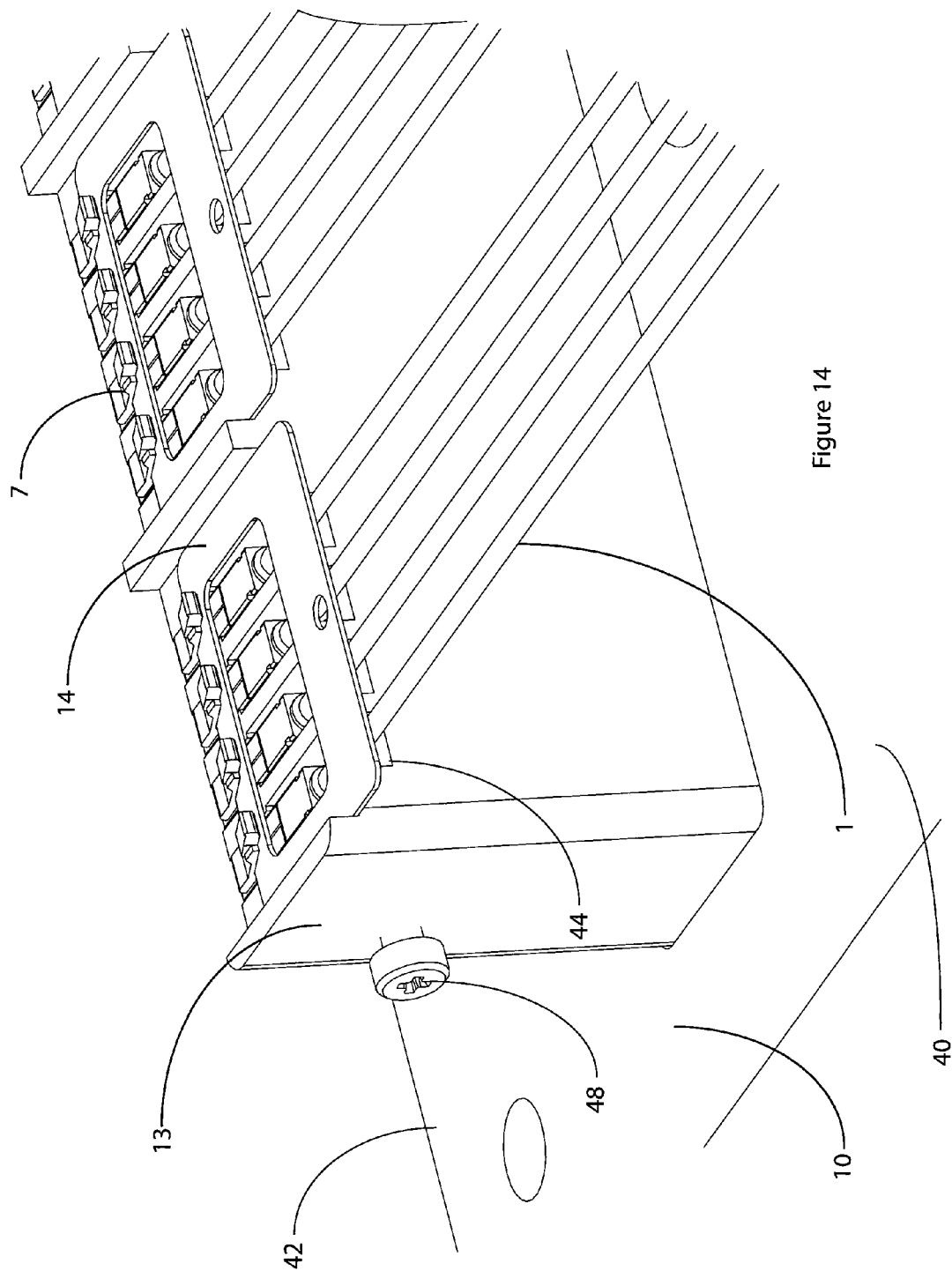
FIG. 14 is an enlarged partial isometric view of a portion of the pallet fixture, showing the cable connectors in the channels defined by the stationary fixture, as seen from the right side in FIG. 12.
Figure 15:
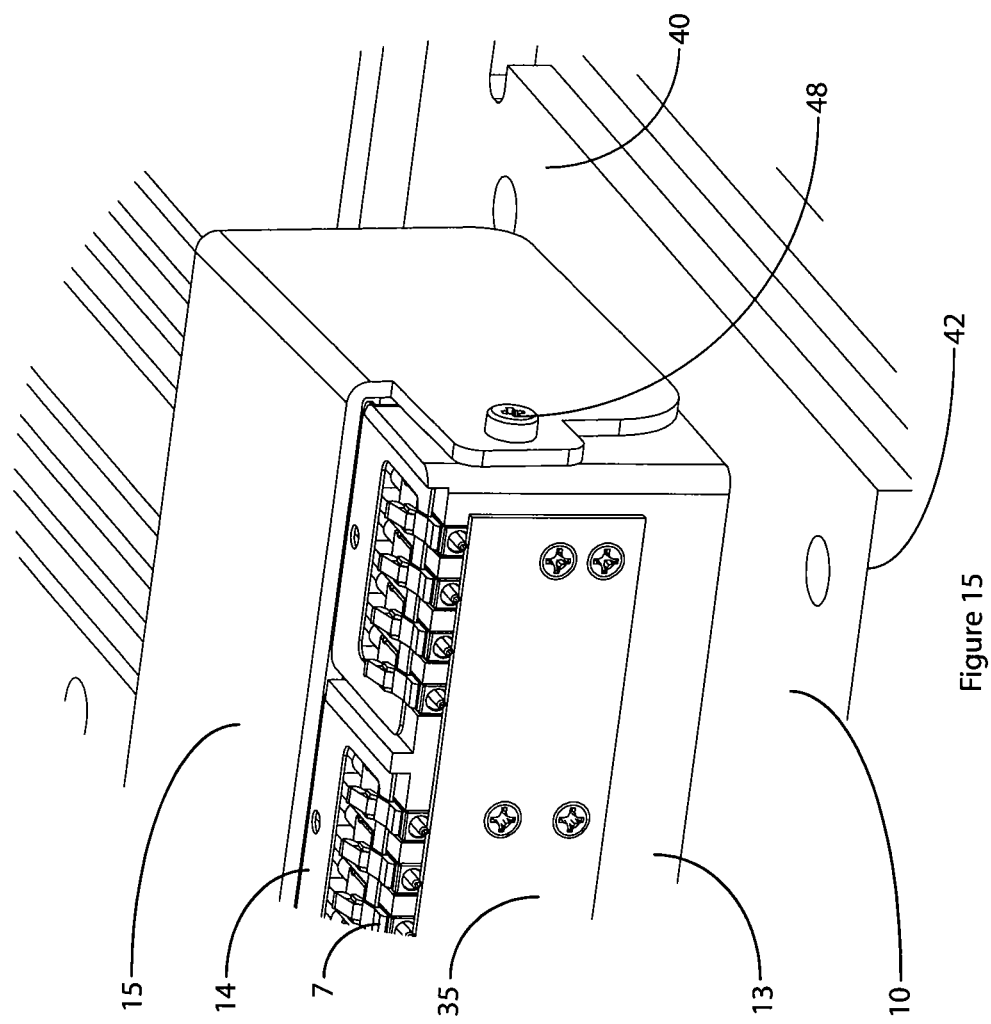
FIG. 15 is an enlarged partial isometric view of a portion of the pallet fixture, similar to FIG. 12, showing the cable connectors in the channels defined by the stationary fixture and the heat shield pivoted into position.
Figure 16:
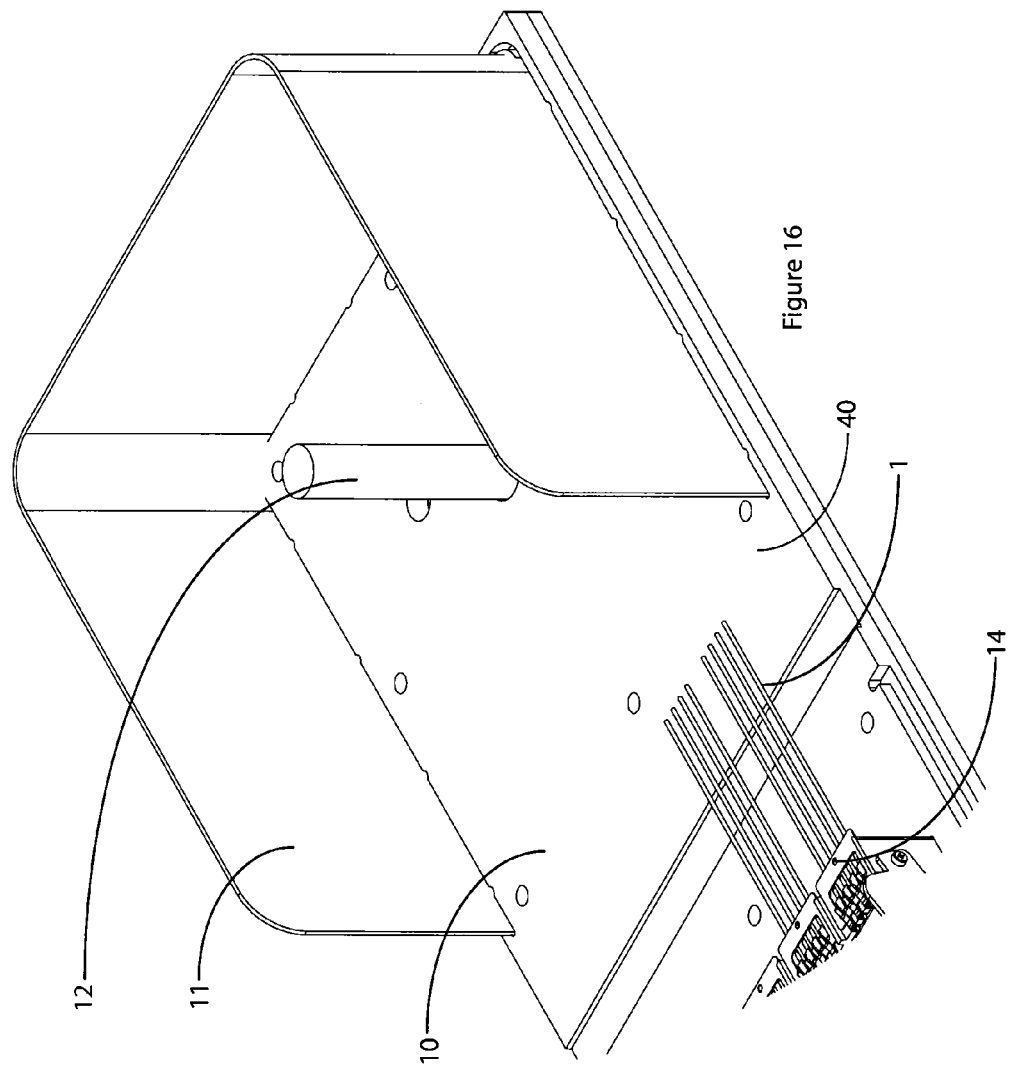
FIG. 16 is a partial isometric view of the pallet fixture, similar to FIG. 5A.

Reference is made to FIGS. 1, 2 and 3, which illustrate the construction of a fiber optic cable 1, and the cable connector 7. Fiber optic cables typically include an optical fiber 2 which is usually encapsulated in a buffer tube 3, with a strength member 4 supporting the cable. A strain relief boot 5, crimp ring 6, and optical connector 7, containing a ferrule 8 for supporting the fiber, are included in the cable assembly 0, as well. As will be explained below, during the cable assembly process, the cable assembly 0 has an optical fiber 9 that protrudes from the ferrule 8 within the connector 7 and that will be processed by the system.

Ad described previously, the outer layers of the fiber optic cable 1, including the buffer tube 3, the strength member 4, and the cable sheath, are stripped away at an end of the cable 1, and the optical fiber 2 exposed. An epoxy is inserted into the ferrule 8 in connector 7. The optical fiber 2 is then inserted into the ferrule 8 and emerges as the protruding fiber 9 (FIG. 3) extending from connector 7. The epoxy must then be heated in an oven to effect a cure, and the fiber 9 cut and polished.

With the system of cable manufacture described herein, and as illustrated in FIGS. 4-7, each cable assembly 0, having connectors 7 at both ends is placed on a pallet fixture 10 to provide support, while permitting the automated processing simultaneously of multiple cable assemblies. Additionally, by using the illustrated pallet fixture 10, a consistent method of processing the optical connectors results. The cable assemblies 0 are each placed between a supporting band 11 and a support post 12 on the pallet fixture 10 to keep the assemblies in place during processing. Each individual connector 7 is placed in a separate channel defined by stationary fixture 13 attached to the pallet fixture 10. Each of the connectors 7 is then secured in place with one of the latching plates 14 to stabilize. By this arrangement, the connectors 7 are held in place securely during all stages of processing.

After the cable assemblies 0 have been loaded onto the pallet fixture 10, a heat shield 15 is pivoted over the cables to protect the cable jackets from excessive exposure to heat while the connectors are in oven 16. The pallet fixture 10 is pushed onto a conveyer 17 with a guidance rail 18. The conveyer 17 is powered-on by a sensor 19 and the conveyor pulls the pallet 10 to the first lift 20, where the conveyor is stopped by a second sensor 21. The first lift 20 then is activated to raise the pallet fixture 10 up to a specific position which inserts the connectors 7 containing the heat curable epoxy within an oven 16. The oven is activated by a third sensor 22. After operating for a specified time, the oven 16 turns off and the lift 20 lowers the pallet fixture 10 back to the conveyor 17. The conveyor is then switched on and the pallet fixture 10 is conveyed to a second lift 23. Once the pallet fixture 10 is in position, a fourth sensor 24 activates the second lift 23 and the pallet fixture 10 is brought within close proximity to the robot 25. The robot 25 is activated by a fifth sensor 27. The robot 25 brings a scribing blade 28 up to the connectors 7 and proceeds to score and remove the excess protruding fibers 9 close to the connector end faces. Then, the robot 25 brings a calibrated buffing stone 29 to the surface of the connectors and removes the protruding glass fiber 9 and epoxy down to the surface of the connector ferrule 7. The robot 25 then polishes glass fiber 9 using lapping film mounted on a motorized buffing wheel 29 to produce a mirror-like surface. Lapping films are discarded in a receptacle 30 and a new sheet of film is secured as a robotic function from a film dispenser 31. The steps in the processing of the cable assemblies 0 are precisely controlled by a computer 32.

Figure 17:
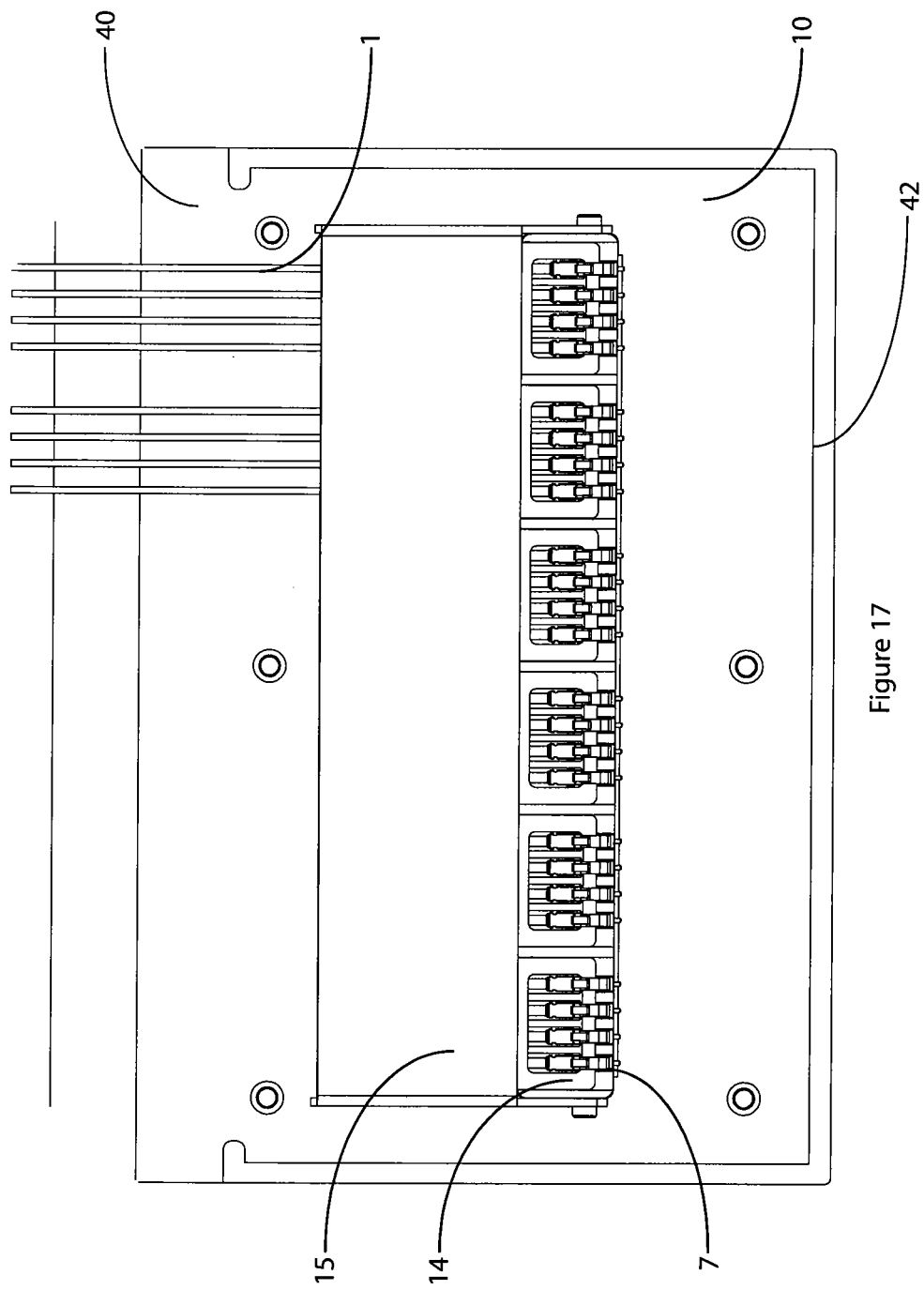
FIG. 17 is a partial top plan view of the pallet fixture.

FIGS. 8-18 illustrate the pallet fixture 10 in greater detail. As explained above, this pallet fixture holds a plurality of fiber optic cables and connectors during movement along a manufacturing line so that the connectors can be secured to the cable ends, and the ends of the cables finished. The pallet fixture 10 includes a rectangular pallet base plate 40, to which stationary fixture 13 is mounted along one edge 42 of the pallet base plate 40. The stationary fixture 13 defines a plurality of channels 44 for receiving fiber optic cable connectors 7 of the plurality of fiber optic cable assemblies 0. At least one latching plate 14 is provided for retaining the connectors in the plurality of channels 44. As shown in the figures, a plurality of latching plates 14 may be used, with each latching plate being received in slots in the stationary fixture 13 to hold it in place. The pallet fixture 10 includes heat shield 15 which is secured to the stationary fixture 13 at pivots 48 at each end such that the cables may be protected from heat during heat treatment of the connectors. The heat shield 15 is pivotally attached to the stationary fixture 13 such that it can be pivoted into an open position, such as shown in FIG. 18, to permit loading and unloading the pallet fixture 10 with a plurality of fiber optic cables and connectors, and into a closed position, such as shown in FIG. 17, in which the connectors may be exposed to heat from a furnace while the cables are shielded from the heat.

It will be appreciated that variations in the above may prove useful. For example, the robotic processor that cuts the optical fibers of the fiber optic cables, buffs the ends of the optical fibers, and then polishes the ends of the fibers may perform only one or two of these operations, with the balance being performed subsequently, either manually or with the use of other, automated equipment.

What is claimed is:

1. A pallet fixture for holding a plurality of fiber optic cables and connectors during movement along a manufacturing line so that the connectors are secured to the cable ends, and the ends of the cables finished, comprising:
    a rectangular pallet base plate,
    a stationary fixture mounted along one edge of said pallet base plate, said stationary fixture defining a plurality of channels for receiving fiber optic cable connectors of said plurality of fiber optic cables,
    at least one latching plate for retaining said connectors in said plurality of channels, and
    a heat shield secured to said stationary fixture such that said cables are protected from heat during heat treatment of the connectors.

2. The pallet fixture for holding a plurality of fiber optic cables and connectors during movement along a manufacturing line so that the connectors are secured to the cable ends, and the ends of the cables finished, according to claim 1 in which said pallet fixture includes a plurality of latching plates.

3. The pallet fixture for holding a plurality of fiber optic cables and connectors during movement along a manufacturing line so that the connectors are secured to the cable ends, and the ends of the cables finished, according to claim 1 in which said pallet fixture further includes a support post extending upward from said base plate, such that said plurality of fiber optic cables are wrapped therearound.

4. The pallet fixture for holding a plurality of fiber optic cables and connectors during movement along a manufacturing line so that the connectors are secured to the cable ends, and the ends of the cables finished, according to claim 1 in which said heat shield is pivotally attached to said stationary fixture such that said heat shield is pivoted into an open position to permit loading and unloading said pallet fixture with a plurality of fiber optic cables and connectors, and into a closed position in which said connectors are exposed to heat from a furnace while said cables are shielded from such heat.

5. An automated fiber optic connector processing system for processing a plurality of fiber optic cables and connectors, each of said cables including an optical fiber, comprising:
    a pallet fixture for holding a plurality of fiber optic cables and connectors during movement along a manufacturing line so that the connectors are secured to the cable ends, and the ends of the cables finished, said fixture including a pallet base plate, a stationary fixture mounted along one edge of said pallet base plate, said stationary fixture defining a plurality of channels for receiving fiber optic cable connectors of said plurality of fiber optic cables, and at least one latching plate for retaining said connectors in said plurality of channels,
    an oven at a first processing station having an elongated oven opening,
    a robotic processor at a second station for cutting said optical fibers of said fiber optic cables, buffing the ends of said optical fibers, and polishing the ends of said optical fibers, and
    a conveyor for moving said pallet fixture to said first processing station for heat treating said connectors, and for moving said pallet fixture to said second processing station for cutting and polishing said optical fibers.

6. The automated fiber optic connector processing system for processing a plurality of fiber optic cables and connectors according to claim 5, in which said pallet fixture includes a plurality of latching plates.

7. The automated fiber optic connector processing system for processing a plurality of fiber optic cables and connectors according to claim 5, in which said pallet fixture further includes a support post extending upward from said base plate, such that said plurality of fiber optic cables are wrapped therearound.

8. The automated fiber optic connector processing system for processing a plurality of fiber optic cables and connectors according to claim 5, in which said pallet fixture further includes a heat shield secured to said stationary fixture such that said cables are protected from heat during heat treatment of the connectors.

9. The automated fiber optic connector processing system for processing a plurality of fiber optic cables and connectors according to claim 8, in which said heat shield is pivotally attached to said stationary fixture such that said heat shield are pivoted into an open position to permit loading and unloading said pallet fixture with a plurality of fiber optic cables and connectors, and into a closed position in which said connectors are exposed to heat from a furnace while said cables are shielded from such heat.

10. The automated fiber optic connector processing system for processing a plurality of fiber optic cables and connectors according to claim 5, in which said pallet fixture further includes a supporting band, mounted on said pallet base plate and extending partially around the periphery thereof to retain said plurality of cables on said pallet fixture.

11. The automated fiber optic connector processing system for processing a plurality of fiber optic cables and connectors according to claim 5, in which said conveyor transports said pallet fixture to said elongated opening such that said connectors are exposed to heat from said oven.

12. The automated fiber optic connector processing system for processing a plurality of fiber optic cables and connectors according to claim 5, in which said oven directs heat to each of the connectors such that the epoxy therein is cured.

13. The automated fiber optic connector processing system for processing a plurality of fiber optic cables and connectors according to claim 5, in which said robotic processor is capable of processing each connector.

14. The automated fiber optic connector processing system for processing a plurality of fiber optic cables and connectors according to claim 13, in which robotic processor includes a scribing blade, a buffing pad, and polishing wheel.

15. An automated fiber optic connector processing system for processing a plurality of fiber optic cables and connectors, each of said cables including an optical fiber, comprising:
   a pallet fixture for holding a plurality of fiber optic cables and connectors during movement along a manufacturing line so that the connectors are secured to the cable ends, and the ends of the cables finished, said fixture including a pallet base plate, a stationary fixture mounted along one edge of said pallet base plate, said stationary fixture defining a plurality of channels for receiving fiber optic cable connectors of said plurality of fiber optic cables, and at least one latching plate for retaining said connectors in said plurality of channels,
   an oven at a first processing station having an elongated oven opening,
   a robotic processor at a second station for cutting said optical fibers of said fiber optic cables, and
   a conveyor for moving said pallet fixture to said first processing station for heat treating said connectors, and for moving said pallet fixture to said second processing station for cutting and polishing said optical fibers.

16. The automated fiber optic connector processing system for processing a plurality of fiber optic cables and connectors according to claim 15, in which said pallet fixture includes a plurality of latching plates.

17. The automated fiber optic connector processing system for processing a plurality of fiber optic cables and connectors according to claim 15, in which said pallet fixture further includes a heat shield secured to said stationary fixture such that said cables may be protected from heat during heat treatment of the connectors.

18. The automated fiber optic connector processing system for processing a plurality of fiber optic cables and connectors according to claim 17, in which said heat shield is pivotally attached to said stationary fixture such that said heat shield are pivoted into an open position to permit loading and unloading said pallet fixture with a plurality of fiber optic cables and connectors, and into a closed position in which said connectors are exposed to heat from a furnace while said cables are shielded from such heat.

19. The automated fiber optic connector processing system for processing a plurality of fiber optic cables and connectors according to claim 15, in which said conveyor transports said pallet fixture to said elongated opening such that said connectors are exposed to heat from said oven.

* * * * *